A. M. LEONI.
MOWING MACHINE.
APPLICATION FILED APR. 18, 1908.
919,039.
Patented Apr. 20, 1909.
2 SHEETS—SHEET 2.
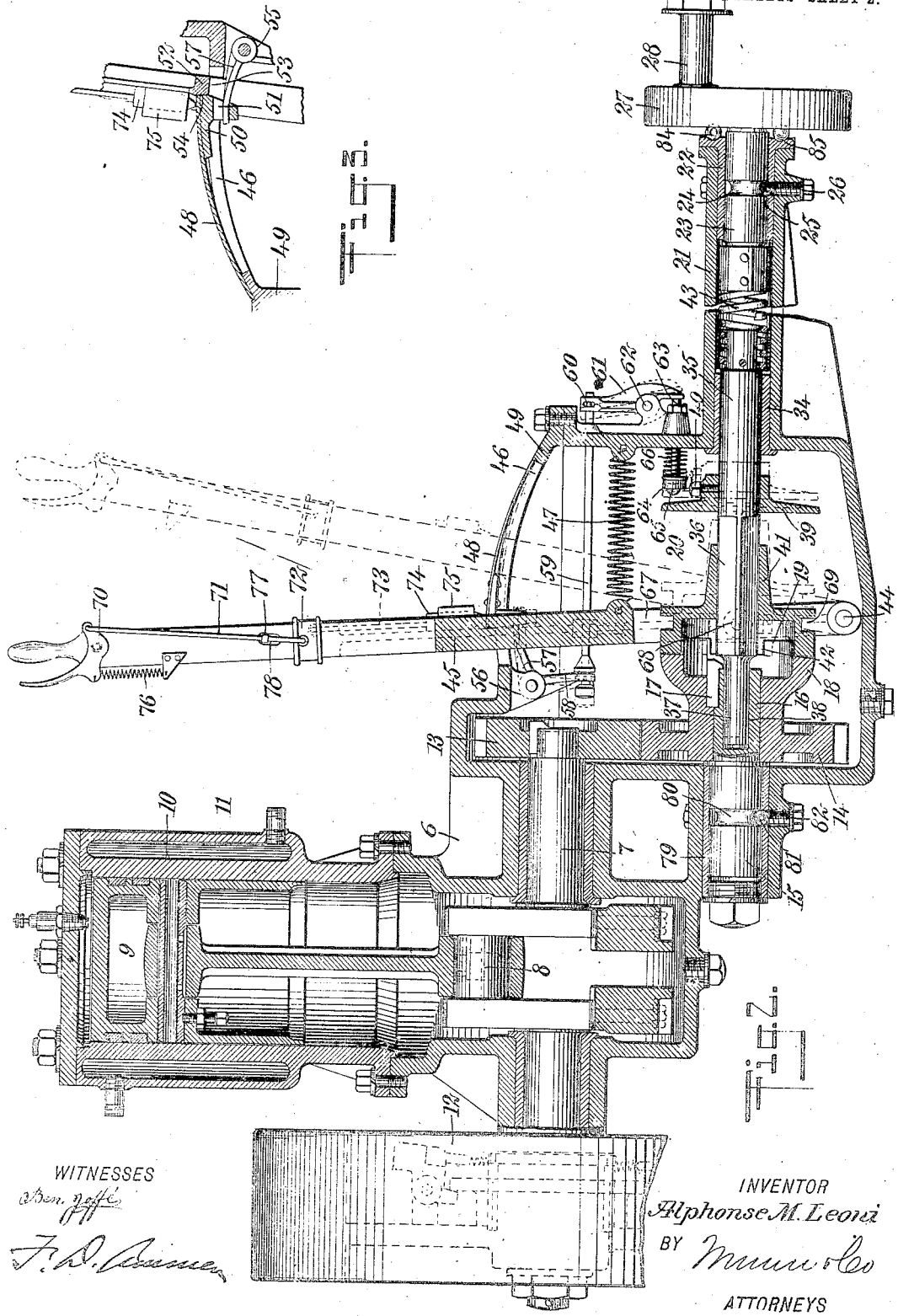
WITNESSES
INVENTOR
Alphonse M. Leoni
BY Munn & Co
ATTORNEYS

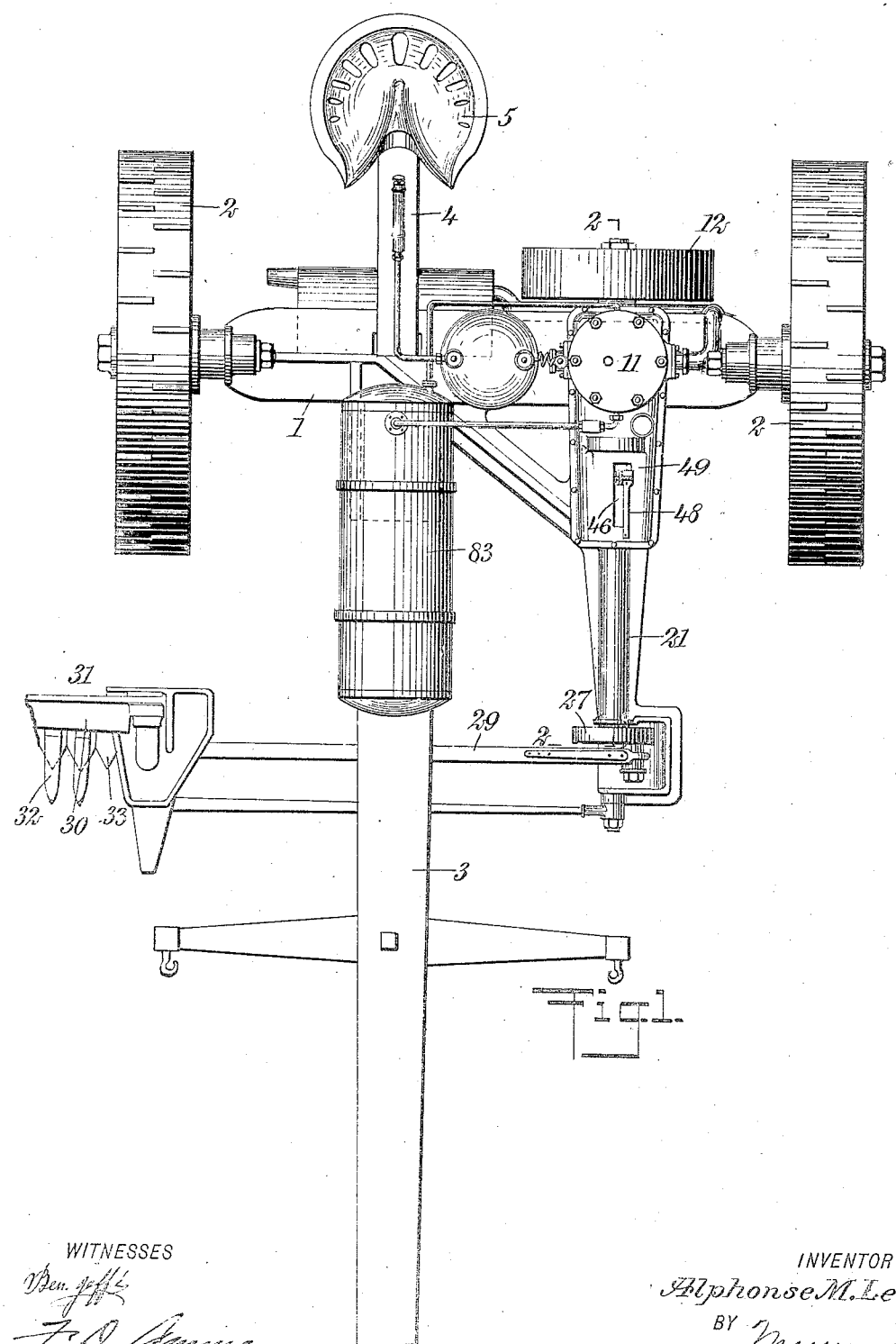

UNITED STATES PATENT OFFICE.

ALPHONSE M. LEONI, OF HIGHLAND, NEW YORK, ASSIGNOR TO THE AGRICULTURAL MACHINES IMPROVEMENT COMPANY, OF NEW YORK, N. Y., A CORPORATION OF NEW YORK.

MOWING-MACHINE.

No. 919,039.     Specification of Letters Patent.     Patented April 20, 1909.

Application filed April 18, 1908. Serial No. 427,775.

*To all whom it may concern:*

Be it known that I, ALPHONSE M. LEONI, a subject of the King of Italy, and a resident of Highland, in the county of Ulster and State of New York, have invented a new and Improved Mowing-Machine, of which the following is a full, clear, and exact description.

This invention relates to farm implements such as mowing machines or similar implements which are drawn by horses in harvesting or planting.

More specifically, the invention relates to a mowing machine. These machines are usually constructed in such a way that the power for driving the mower bar is derived from the wheels of the machine, so that the work performed by the draft animals may be considered as having two components, one of which is the work necessary to drive the implement, while the other is the work necessary to drive the mower bar or cutter. This is not an advantageous arrangement, as the speed of the operation of the mower bar is directly dependent upon the speed of advance of the implement. These two factors should be independent of each other, as the grain or grass being cut may be unusually thick or closely planted at a point where it is not feasible to drive the implement at a high speed.

The object of this invention is to provide an arrangement whereby the mower bar or cutter may be driven entirely independently of the speed of advance of the implement.

A further object of the invention is to provide an arrangement of mechanism for transmitting the driving force to the cutter bar, which will operate in such a way as to prevent injury to the teeth of the cutter when obstructions such as stones or the like, become caught in the teeth. This mechanism operates automatically to throw the driving mechanism of the cutter bar out of operation. In this way accidents to the cutter bar and other parts of the machinery are prevented.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a plan of a machine constructed according to my invention, parts of the tongue and mower bar being broken away, and the releasing lever for the driving mechanism of the mower bar being shown in cross section; Fig. 2 is a vertical section on the line 2—2 of Fig. 1; and Fig. 3 is a detail view further illustrating the automatic mechanism for disengaging the drive of the mower bar.

Referring more particularly to the parts, 1 represents the frame of the machine, which is mounted upon wheels 2 of usual form. These wheels, however, are not connected with any of the mechanism of the implement, but simply support it. From the frame 1 a tongue 3 extends forwardly, to which horses or other draft animals may be hitched in the usual manner.

To the rear of the frame 1 in alinement with the pole or tongue 3, a seat post 4 is provided, having a seat 5 upon which the driver sits. At the left of the machine; that is, toward the end of the frame 1 which lies opposite to the pole 3, an engine frame 6 is securely attached to the frame 1, and in this frame there is mounted a crank shaft 7, the crank 8 whereof is driven by the piston 9 reciprocating in the cylinder 10 of a gas engine 11. The cylinder 10 is seated upon the upper side of the frame 6. The crank shaft 7 extends toward the rear, and is provided with a balance wheel 12. The forward end of the crank shaft is provided with a gear wheel 13 which meshes with a similar gear wheel 14 which is rigidly attached to a stub shaft 15 which is mounted in the frame 6 below the shaft 7, as indicated. The gear 14 is connected to a reduced neck 16 of the shaft 15 by means of a suitable key 17 as shown. The gear wheel 14 is formed integral with an enlarged hub 18 which has teeth 19 as shown, so that the hub constitutes a clutch member. The engine frame at this part is formed into a closed gear case or clutch case 20, and from the outer side of this clutch case a tubular bearing 21 extends forwardly, the same being in alinement with the stub shaft 15.

In the forward end of this tubular bearing 21 a bushing 22 is mounted, and rotatably set in this bushing a stub shaft 23 is provided. This shaft has a circumferential groove 24 formed therein, which affords means for holding the shaft in position through the medium of a plurality of balls 25, the said balls being held in position by follower screws 26, as indicated in Fig. 2.

The stub shaft 23 carries rigidly a crank disk 27 having a wrist pin 28 to which is attached the pitman 29 which operates the cutter bar 30. This cutter bar 30 forms a part of the mower bar 31, which is of the usual form. The mower bar comprises the usual guard fingers 32 through which the triangular blades 33 of the cutter bar reciprocate.

The inner end of the tubular bearing 21 is provided with a bushing 34 in which there is rotatably and slidably mounted a clutch shaft 35. The inner part of this clutch shaft has an angular neck 36, which may be of square form as indicated, and the inner extremity of the shaft is formed into a reduced neck 37 which is rotatably mounted in a bore 38 formed in the neck 16 aforesaid. It should be understood that the neck 37 is fitted loosely into the bore 38 so that the shaft 35 may shift longitudinally as well as rotate. On the round part of the shaft 35 near the square neck 36 a trip disk 39 is rigidly attached by means of a set screw 40, and on the square neck 36 there is slidably mounted a clutch member 41 which has clutch teeth 42 similar to the clutch teeth 19 of the clutch member 18. The arrangement is such that when the teeth of these clutch members are in engagement, the rotation of the crank shaft 7 may be transmitted to the clutch shaft 35. It should be understood, however, that if the clutch member 41 is slid longitudinally toward the position in which it is indicated in dotted outlines, the clutch will be thrown open and the engine and driving mechanism will be disconnected from the shaft 35. The clutch shaft 35 affords means for driving the stub shaft 23 through the medium of a helical spring or flexible connection 43, and it should be understood that the direction of driving is such as to subject the spring to a tensile force and not to a compressing force. In other words, the rotating shaft 35 pulls the stub shaft 23 so that they will rotate in unison. The ends of the spring are attached to the ends of the shafts which it connects, in any suitable manner, such as that shown.

In the lower part of the gear case 20 a pivot pin 44 is provided, which constitutes the fulcrum for a shifting lever 45, which extends upwardly through the case and passes through a slot 46 in the upper side thereof. To the forward side of this lever a spring 47 is attached, the opposite end of which spring is attached to the case, and this spring tends to pull the lever forward in such a way as to open the clutch, as will be readily understood. At the slot 46 there is provided a longitudinally disposed leaf spring or detent 48, the forward end of which spring is rigidly attached to the cover 49 of the case. The cover and the spring are slightly curved or bowed as shown, and the spring tends to move upwardly at its free end, at which point the under side of the spring is provided with a stirrup 50. This stirrup projects downwardly from the under side of the spring, and is provided with an opening 51 for a purpose which will appear more fully hereinafter. The lever adjacent to the spring 48 presents a shoulder 52 having a face 53 which is adapted to slide along on the outer side of the spring 48, and this shoulder also presents a face 54 substantially at right angles to the face 53. The arrangement is such that if the lever be moved toward the left to the limit of its movement, as in closing the clutch, the detent 48 will spring up into position so that the end of the detent presents itself against the face 54 so as to prevent the lever from being pulled back by the spring 47. This detent or spring 48 will be pulled down automatically if an obstruction comes between the teeth of the cutter at the mower bar. For this purpose I provide a rocker 55 which is pivotally mounted at 56 on the inner side of the case 20, and this rocker has a finger 57 which projects into the opening 51 of the stirrup. This rocker is further provided with a downwardly extending arm 58, and this arm 58 has an opening in which is mounted a horizontal stem 59 which passes to the exterior of the case 20 through the forward wall thereof, as indicated. The projecting end of this stem has a pin-and-slot connection 60 with a releasing toe 61, which toe is pivoted at 62, the lower end of the toe lying adjacent to a releasing pin 63. This releasing pin is slidably mounted in the forward wall of the case, and projects into the interior thereof. The inner end of the pin 63 is formed into a head 64 which forms a socket for a ball 65, and this ball lies at or near the forward face of the trip disk 39. A spring 66 is disposed around the pin 63 between the head 64 and the wall of the case, and tends to hold the pin in an extreme inward position.

On account of the fact that the transmission to the mower bar is effected through the spring 43, it follows that if an obstruction comes between the teeth of the mower bar so as to arrest the movement of the cutter bar, the spring 43 will become abnormally twisted, and this will shorten its length in such a way that the clutch shaft 35 will be drawn forwardly. When this occurs the forward side of the trip disk 39 strikes the ball 65 and pushes the pin 63 forwardly. This movement is transmitted through the toe 61 and stem 59 to the rocker 55. In this way the finger 57 of the rocker will be pulled downwardly. This draws the free end of the detent 48 downwardly and releases the shoulder 52. The spring 47 then operates to pull the lever over to the position in which it is shown in dotted lines in Fig. 2. The lower end of this lever is formed into a yoke 67 having pins 68 which are received in a groove 69 formed on the outer face of the clutch member 41, as indicated. In this way the clutch opens automatically so as to prevent injury to the cutter. In addition to this, I provide hand-releasing mechanism for disengaging the detent 48 from the lever. For this purpose, on the upper end of the hand lever 45 I provide a grip lever 70 which is provided with a link 71, the lower end of which is attached to a sliding collar 72 moving on the lever. This collar is connected by a link 73 with a sliding shoe 74 which is guided in a guide bracket 75 attached to the side of the lever. The shoe 74 is formed with a nose which is adapted to rest against the upper side of the free end of the detent 48 when the lever is locked, as indicated in Fig. 3. By operating the grip lever 70 the shoe 74 may be depressed so as to force the detent 48 downwardly past the shoulder 52. It should be observed that the opening 51 in the stirrup 50 is quite large, so that the depressing of the detent in this manner does not affect the rocker 55 or the parts connected therewith. The spring 76 which is attached to the grip lever 70 normally holds the collar 72 and the shoe 74 in their most elevated position. The link 71 is provided with a guide stud 77 which passes through a guide slot 78 formed in the hand lever as shown.

Referring again to the stub shaft 15, as indicated in Fig. 2 this stub shaft is mounted in a bushing 79, and the shaft is provided with a circumferential groove 80 similar to the groove 24 of the shaft 23. A plurality of balls 81 are set in this groove and mounted in the bushing, being held in position by follower screws 82 as indicated.

While I have described the means for driving the mower bar as a gasolene engine, it should be understood that I may use a prime mover of any kind for this purpose; and special attention is called to the independence of the movement of the vehicle and the movement of the mower bar. The engine or other motor which drives the mower bar will have the usual accessories, so that its operation can be completely controlled. If the motor is a gas engine as suggested, the supply tank 83 of gasolene is very conveniently located on the rear end of the tongue just forward of the driver's seat. Evidently, the machine may be driven at any speed desired, and the work which will be done by the draft animals is simply that necessary to draw the vehicle along. All the work of cutting the standing crop is done by the engine. In order to reduce the friction at the disk 27, antifriction balls 84 are provided, which run on the inner face of the disk, being mounted in a ball-race or groove 85 on the forward end of the bushing 22.

The general mode of operation of the entire machine will now be briefly described: When the machine is in operation, the clutch lever 45 occupies the position shown in full lines in Fig. 2, at which time the clutch, composed of the clutch members 18 and 41, is closed. The rotation of the crank shaft 7 is then transmitted through the clutch and through the spring 43 to the crank disk 27. The crank disk reciprocates the cutter bar through the pitman 29, as will be readily understood. When the lever is in this position, it is held against being returned to open clutch position by means of the detent 48. When an obstruction is encountered by the cutter bar, the spring 43 shortens and the trip plate 39 operates through the stem 59 and the parts connected therewith so as to depress the detent 48 and release the lever. The spring 47 then pulls the lever over and opens the clutch. In addition to this automatic means for opening the clutch, the grip lever 70 may be operated so that it depresses the shoe 74 against the free end of the detent to release the lever. The head 64 is screwed adjustably to the pin 63, so that the position of the ball 65 may be nicely adjusted with respect to the disk. By this means the device may be regulated so that it will take any desired contraction of the spring to open the clutch.

Having thus described my invention, I claim as new and desire to secure by Letters Patent:

1. In a mowing machine, in combination, a cutter bar, mechanism for transmitting a driving force to said cutter bar, and automatic means for disengaging said mechanism when the motion of said cutter bar is arrested.

2. In a mowing machine, in combination, a cutter bar, a clutch, means for driving said cutter bar through said clutch, and means for opening said clutch when said cutter bar is arrested.

3. In a mowing machine, in combination, a cutter bar, a shaft for driving said cutter bar, having a flexible connection therewith, a clutch through which said shaft is driven, and means for opening said clutch actuated through the medium of said flexible connection.

4. In a mowing machine, in combination, a cutter bar, a shaft connected with said cutter bar for operating the same, a second shaft adapted to drive said first shaft, a helical resilient member connecting said shafts and through which the movement is transmitted, said resilient member being adapted to shorten when the motion of said cutter bar is arrested, and means controlled thereby for disengaging the driving mechanism.

5. In a mowing machine, in combination, a cutter bar, a helical spring, means for driving said cutter bar through said helical spring, a clutch through which said helical spring is driven, said spring being adapted to shorten under the action of the driving force when said cutter bar is arrested, and means actuated by said spring for opening said clutch.

6. In a mowing machine, in combination, a clutch, a spring tending to open said clutch, means for locking said clutch in a closed position, a cutter bar, means for driving said cutter bar through said clutch, and means for disengaging said locking means actuated by the arrest of said cutter bar.

7. In a mowing machine, in combination, a clutch, a clutch shaft, a cutter bar, a helical spring through which said clutch shaft drives said cutter bar, said spring being adapted to shorten under the driving force when said cutter bar is arrested, a member rigid with one end of said spring and adapted to be displaced when said spring shortens, and means actuated by said member for opening said clutch.

8. In a mowing machine, in combination, a clutch shaft, a clutch through which said shaft is driven, a second shaft, a cutter bar connected with said second shaft, a helical spring connecting said second shaft with said clutch shaft, a trip disk mounted on said clutch shaft and adapted to be displaced longitudinally of said clutch shaft under the driving force if said second shaft is prevented from rotating, and means actuated by said trip disk for opening said clutch.

9. In a mowing machine, in combination, a clutch, a clutch shaft mounted to slide longitudinally, a second shaft, a cutter bar driven from said second shaft, a helical spring connecting said clutch shaft with said second shaft, a trip disk rigidly attached to said clutch shaft, said clutch shaft being adapted to shift longitudinally under the action of the driving force if said second shaft is arrested, and mechanism actuated by said trip disk for opening said clutch.

10. In a mowing machine, in combination, a clutch, a lever adapted to close said clutch, a resilient detent adapted to hold said lever in the position to close said clutch, a cutter bar, and means actuated by the arrest of said cutter bar for releasing said lever from said detent.

11. In a mowing machine, in combination, a clutch, a cutter bar, means for driving said cutter bar from said clutch, a lever adapted to open and close said clutch, a spring tending to move said clutch to its open position, a detent coöperating with said lever to hold the same in the position to close said clutch, and means actuated by the arrest of said cutter bar to release said lever from said detent.

12. In a mowing machine, in combination, a clutch, a cutter bar driven through said clutch, a lever adapted to open and close said clutch, a resilient detent extending in the direction in which said lever swings, and having a free end disposed near said lever and affording means for locking said lever in the position to close said clutch, and means actuated by the arrest of said cutter bar to release said lever from said detent.

13. In a mowing machine, in combination, a clutch, a cutter bar driven through said clutch, a lever adapted to open and close said clutch, a resilient detent extending in the direction in which said lever swings, and having a free end disposed near said lever and affording means for locking said lever in the position to close said clutch, means actuated by the arrest of said cutter bar to release said lever from said detent, and hand-operated means for releasing said detent and independent of said first releasing means for said detent.

14. In a mowing machine, in combination, a clutch shaft, a clutch, a lever adapted to open or close said clutch, a detent adapted to engage said lever to hold the same in the position to open said clutch, a member engaging said detent and adapted to move the same to release said lever, a spring through which the driving force is transmitted beyond said clutch, a cutter bar, a trip disk adapted to be displaced by the shortening of said spring, and means actuated by said trip disk for actuating said member.

15. In a mowing machine, in combination, a clutch, a lever adapted to open or close said clutch, a resilient detent adapted to hold said lever in the position to open said clutch, said detent consisting of a leaf spring fixed at one end and free at the opposite end, a stirrup carried by said detent at the free end thereof, a rocker engaging said stirrup and adapted to draw the same out of engagement with said lever, a clutch shaft, a second shaft, a cutter bar driven by said second shaft, a spring connecting said shafts and adapted to shorten under the driving force when said cutter bar is arrested, a trip disk carried by said clutch shaft and adapted to be displaced longitudinally of said shaft when said spring shortens, and means for actuating said rocker from said trip disk to release said lever.

16. In a mowing machine, in combination, a rotatable clutch member, a clutch shaft coaxial therewith, a slidable clutch member adapted to rotate said shaft and coöperating with said first clutch member, a lever actuating said second clutch member, a second shaft, a spring connecting said second shaft with said clutch shaft for driving the former, a cutter bar driven from said second shaft, a trip disk attached rigidly to said clutch shaft and adapted to be displaced longitudinally therewith under the action of the driving force when said cutter bar is arrested, and means actuated by said trip disk for opening said clutch.

In testimony whereof I have signed my name to this specification in the presence of two subscribing witnesses.

ALPHONSE M. LEONI.

Witnesses:
  ALDO BOLOGNESI,
  ALFRED BOLOGNESI.